United States Patent [19]

Horner

[11] 4,456,746

[45] Jun. 26, 1984

[54] POLYESTER CONTAINING RESIDUES OF A 1-HYDROXY-3-6-BIS(HYDROXYALKOX-Y)XANTH-9-ONE, PROCESS FOR PREPARING SAME AND SHAPED ARTICLES THEREOF

[75] Inventor: Patrick J. Horner, Wiltshire, England

[73] Assignee: Imperial Chemical Industries PLC, London, England

[21] Appl. No.: 424,294

[22] Filed: Sep. 27, 1982

[30] Foreign Application Priority Data

Oct. 2, 1981 [GB] United Kingdom ................ 8129808
Oct. 21, 1981 [GB] United Kingdom ................ 8131765

[51] Int. Cl.$^3$ ...................... C08G 63/18; C08G 63/66
[52] U.S. Cl. .................................... 528/128; 528/125; 528/126; 528/176
[58] Field of Search ................ 528/125, 126, 128, 176

[56] References Cited

U.S. PATENT DOCUMENTS

| | | | |
|---|---|---|---|
| 3,385,910 | 5/1968 | Tocker ................................. | 528/125 |
| 3,577,211 | 5/1971 | Wilson ................................ | 528/125 |
| 4,188,476 | 2/1980 | Irwin .................................. | 528/125 |
| 4,224,433 | 9/1980 | Calundann et al. ................. | 528/125 |
| 4,341,688 | 7/1982 | Charbonneau et al. ............ | 528/125 |

FOREIGN PATENT DOCUMENTS

| | | | |
|---|---|---|---|
| 0006686 | 1/1980 | European Pat. Off. ............ | 528/125 |
| 924019 | 4/1963 | United Kingdom ................ | 528/125 |
| 2030158 | 4/1980 | United Kingdom ................ | 528/125 |

*Primary Examiner*—Lester L. Lee
*Attorney, Agent, or Firm*—Cushman, Darby & Cushman

[57] ABSTRACT

A new linear polyester contains in its chain the residues of a hydroxy-bis(hydroxyalkoxy)xanth-9-one e.g. polyethylene terephthalate containing such residues which act as a UV stabilizer. Processes for the preparation of the polymers include the reaction of a dibasic acid, glycol and 1,3,6-trihydroxyxanthone whereby only two of the xanthone hydroxyl groups take part in the polyester-forming reaction.

14 Claims, 1 Drawing Figure

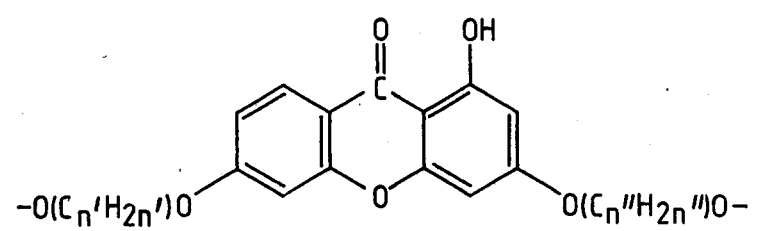
FORMULA 1

POLYESTER CONTAINING RESIDUES OF A 1-HYDROXY-3-6-BIS(HYDROXY ALKOXY)XANTH-9-ONE, PROCESS FOR PREPARING SAME AND SHAPED ARTICLES THEREOF

Linear polyesters have only poor stability under the influence of UV irradition. It is an object of this invention to improve the UV stability of linear polyesters.

Linear polyesters are well known thermoplastic polymers which have chains consisting of alternating residues of glycols and dicarboxylic acids, the residues being connected by means of ester linkages. Many acids and glycols have been proposed for the preparation of linear polyesters. The acids include (a) terephthalic acid, (b) isophthalic acid, (c) naphthalene-2,6-dicarboxylic acid, and (d) bis(carboxyphenoxy)ethane. The glycols include alkane diols with 2 to 10 carbon atoms (e.g. ethylene glycol and 1,4-butane-diol), and 1,4-dimethylol cyclohexane. By far the commonest polyester is poly(ethylene terephthalate). Other commercially used linear polyesters include (a) a copolymer of ethylene glycol with a mixture of terephthalic acid and isophthalic acid said mixture containing 80 to 95 mole % of the terephthalic acid, (b) a polymer of 1,4-butanediol and terephthalic acid, and (c) homopolymer of terephthalic acid and 1,4-dimethylolcyclohexane.

According to this invention a linear polyester contains in its molecule esterification residues of a hydroxy-bis(hydroxy-alkoxy)xanth-9-one, the amount of the said esterification residues being 0.01 to 30% by weight, preferably 0.05 to 5% by weight, based on the total polymer.

The hydroxy-bis(hydroxy-alkoxy)xanth-9-one is preferably a 1-hydroxy-3,6-bis(hydroxy-alkoxy)xanth-9-one and the alkoxy groups are preferably $C_1$ to $C_{10}$ alkoxy more preferably $C_2$ to $C_4$ alkoxy e.g. ethoxy groups.

For example such a linear polyester has an IV (intrinsic viscosity) above 0.50 and it contains in its molecule esterification residues of:
(A) A dicarboxylic acid selected from
 (i) terephthalic acid
 (ii) isophthalic acid
 (iii) naphthalene-2,6-dicarboxylic acid
 (iv) bis(carboxyphenoxy)ethane;
 (v) aliphatic dicarboxylic acids with 4 to 50 carbon atoms in the molecule, e.g. azelaic acid and commercially available dicarboxylic acids with molecular weight in the range 200 to 1,000.
(B) Glycols with 2 to 10 carbon atoms in the molecule or the polymeric ethers formed from one or more of said glycols, e.g. ethylene glycol, 1,4-butane diol and 1,4-dimethylolcyclohexane, poly(ethylene glycol) and poly(butylene glycol) with molecular weight in the range 150 to 3,000; and
(C) 1-hydroxy-bis(hydroxyalkoxy)xanth-9-one; the amount of (C) being between 0.01 and 30% by weight, preferably 0.05 and 5% by weight, based on the amount of (A)+(B)+(C).

An important class of linear polyesters according to the invention has a repeating unit:

—OYO—CO—X—CO— wherein at least 80 mole % of the X groups represent p-phenylene and the remainder represent m-phenylene and at least 90 mole % of the Y groups represent —$C_nH_{2n}$— where n is an integer from 2 to 10, e.g. —$CH_2$—$CH_2$—, and 0.01 to 30% by weight based on the total polymer of the Y groups represent residues of a 1-hydroxy-3,6-bis (hydroxyalkoxy)xanth-9-one said residues having the formula 1 where n' and n" are integers from 1 to 10, preferably 2 to 4 e.g. n'=n"=2.
(Formula 1 is given in the accompanying drawing).

Another important class of elastomeric polyesters according to the invention has a repeating unit:

—OYO—CO—X—CO— wherein:
at least 70 mole % of the X groups represent p-phenylene and at least x mole % of the X groups represent the esterification residues of dicarboxylic acids with 4 to 40 carbon atoms in the molecule, and
at least 70 mole % of the Y groups represent —$C_nH_{2n}$— where n is an integer from 2 to 10, e.g. —$CH_2$—$CH_2$—, at least y mole % of the Y groups represent

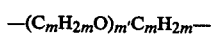

where m is an integer from 2 to 10 and m' is an integer from 2 to 50, e.g.

or

where m" is 15 to 45; and 0.01 to 30% by weight preferably 0.05 to 5% by weight, based on the total polymer of the Y groups represent residues of a 1-hydroxy-3,6-bis(hydroxy-alkoxy)xanth-9-one said residues having the formula 1 where n' and n" are integers from 1 to 10, e.g. n'=n"=2;
and wherein (x+y) is at least 5.

In G.B. No. 924,019 there is described a composition resistant to UV radiation which comprises a polymer and a 1-hydroxyxanthone stabiliser. The polymer may, inter alia be a polyester, exemplified by polyethyleneglycol terephthalate, and the xanthone inter alia 1,3,6-trihydroxyxanthone or 1-hydroxy-3,6-bis-($\beta$-hydroxyethoxy) xanthone. The polymer and stabiliser are however merely in physical admixture and there is no indication that the stabiliser may form an integral part of the polymer. In our earlier European patent application No. 6,686 published on Jan. 9, 1980 there is described a similar polyester to that described in the present application containing residues of 3,6-bis(hydroxyalkoxy)xanth-9-ones. Surprisingly, we have found that it is possible to incorporate into the linear polyester chain residues of a hydroxy-bis(hydroxy-alkoxy)xanth-9-one with one of the hyroxy groups remaining unreacted and not, as might have been expected, acting as a cross-linking agent to destroy the linearity of the polyester chain. The xanthone hydroxy groups which unexpectedly remain unreacted improve further the UV stability of the polymer composition.

Linear polyesters are obtained by a two-stage process. A precursor is obtained in the first stage. This precursor is a low molecular weight ester of the glycol and the dicarboxylic acid. In the second stage the precursor is subjected to polycondensation to increase its molecular weight and thereby obtain the polyester.

There are two common methods for preparing the precursor. In the ester interchange method the glycol is reacted with a dialkyl ester of the dicarboxylic acid. A low molecular weight alcohol is removed thus forming the glycol ester by ester interchange. For example ethylene glycol is reacted with dimethyl terephthalate to form ethylene glycol terephthalate and methyl alcohol (which is removed by distillation). The rate of reaction can be increased by incorporating ester interchange catalysts in the reaction mixture. Suitable ester interchange catalysts include zinc acetate, manganese acetate, calcium acetate, cobalt acetate and titanium tetraisopropoxide.

In the direct esterification method the glycol and the acid are esterified to form the glycol ester with the removal of water, e.g. ethylene glycol is esterified with terephthalic acid. It is usual to carry out direct esterification without catalysts. However, under the acidic conditions which apply during direct esterification, ethylene glycol tends to dimerise according to the reaction:

Some of the diethylene glycol produced by this reaction gets incorporated into the polymer chain but small amounts cause no adverse effects except a lowering of the softening point. The formation of diethylene glycol can be reduced, and hence the softening point kept at a satisfactory level, by including an alkaline compound, e.g. sodium hydroxide, in the direct esterification reaction mixture.

The second stage is carried out by heating the precursor at a temperature above its melting point under low pressure, e.g. below 5 mbar, with stirring. During polycondensation glycol is eliminated (and removed by distillation). As the reaction proceeds the molecular weight and viscosity increase. The increase in viscosity can be used to ascertain when the desired molecular weight has been achieved.

Polycondensation catalysts are usually incorporated during the polycondensation. Suitable polycondensation catalysts include antimony trioxide, germanium dioxide, mixtures of these two, titanium alkoxides, lead oxides and zinc. Some catalysts, e.g. germanium dioxide, are conveniently dissolved in alkali before they are added to the reaction system. In such cases it is particularly appropriate to utilise the alkali which is present in the direct esterification stage to dissolve the catalyst (even though the catalyst has no effect upon the direct esterification).

The metals present during reaction remain in the polymer and, when colourless products are needed, it is necessary to avoid the residues being in the form of coloured derivatives. An acid of phosphorus or an ester of such an acid can be added to the polycondensation mixture; these compounds reduce the colour caused by the metals. Specific examples of phosphorus compounds suitable for adding to the polycondensation reaction include phosphoric acid, triphenyl phosphates and phosphorous acid.

Our earlier EP No. 6686 describes three methods of making polyesters. Two of these are applicable to the polyesters of the present invention and these methods will now be described.

METHOD 1

According to Method 1 linear polyesters, especially polyethylene terephthalate, are prepared by adding 0.04% to 10% by weight, preferably 0.04 to 5% by weight, based on the polymer to be produced, of a trihydroxyxanth-9-one, preferably the 1,3,6-isomer to either the precursor or the ingredients from which it was produced so that condensation takes place in the presence of the trihydroxyxanthone. We have found that when a trihydroxyxanth-9-one is included in a polycondensation mixture one hydroxyl group remains unchanged whereas the other two react with (combined or uncombined) glycol present in the system to form an ether linkage thereby converting the xanthone to a bis(hydroxyalkoxy) derivative. This derivative forms ester linkages with acid residues in the precursor. The overall reaction can be represented as follows (where HOOCACOOH represents the dicarboxylic acid; HOGOH represents the glycol and HOX(OH)OH represents the xanthone)

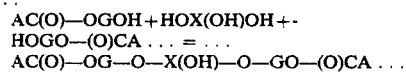

We have no evidence of the mechanism whereby the reaction occurs but we are able to demonstrate the overall effect because:
(a) the phenol cannot be extracted or detected in the polyester,
(b) if the polyester is hydrolysed to its acid and glycol, the hydroxyalkoxy derivative of the phenol is present in the hydrolysate,
(c) the spectrophotometric results and the nuclear magnetic resonance results are compatible with the structure proposed for the product of the reaction.

In the preferred method 1,3,6-trihydroxyxanth-9-one is used and the 1-hydroxyl group remains unchanged.

METHOD 2

According to Method 2 linear polyesters as described above are prepared by incorporating a hydroxy-bis(hydroxy-alkoxy)xanth-9-one, preferably the 1,3,6 isomer, in either the precursor or into the ingredients from which the precursor is prepared. The preferred alkoxy group is ethoxy.

Method 2 is particularly suitable for polyesters based on glycols other than ethylene glycol, e.g. polybutyleneterephthalate.

The polyesters according to the invention can be converted to shaped articles which have good stability to UV irradiation. The shaped articles include fibre and films, e.g. metallised film and coextruded laminates which have the polymer according to the invention as one or both outer layers. The metallised films may be used as reflectors in solar energy collectors. The transparent films may be used as windows, greenhouses, cloches, transparent coverings for solar cells.

The shaped articles may be made entirely from the polyesters according to the invention or they may be made from blends of this polymer and conventional polyesters.

The preparation of polymers according to the invention will now be described by way of example.

In the Examples 1,3,6-trihydroxyxanth-9-one will be abbreviated to 136THX.

EXAMPLE 1

This Example describes the preparation of a linear polyester according to the invention using a two-stage process comprising (1) direct esterification followed by (2) polycondensation. To start Stage 1, the following reactants were charged to an autoclave:
60.5 kg: terephthalic acid
30 liters: ethylene glycol
3.5 g: germanium dioxide
3.5 g: sodium hydroxide
(For convenience of handling the GeO$_2$ and the NaOH were both dissolved in the same small portion, about 50 g, of the ethylene glycol.)

The autoclave was pressurised to about 3 atm and heated with stirring. The reaction commenced and water of esterification was removed with some of the excess of glycol. The temperature remained at the reflux temperature. All the water of esterification had been removed in about 2.5 hours when the temperature had risen to 248° C. The pressure was released over a period of about 5 minutes and a small amount (about 5 liters) of glycol removed. This completed the (conventional) direct esterification and 119 g of triphenylphosphate (in methanol) were added. 77 kg of product, which was a conventional precursor for the preparation of polyethylene terephthalate, were obtained and used for polycondensation.

The precursor was then transferred to the polycondensation vessel and prepared for Stage 2, i.e. polycondensation, was begun by the addition of 2100 g 136THX, i.e. 2.7% by weight of the precursor, and 21 g of antimony trioxide. Removal of glycol was started by distillation at 230° C. under atmospheric pressure with stirring. When the distillation had started, the pressure was slowly reduced to 0.3 m bar and the temperature was kept at 290° C. The pressure was allowed to return to atmospheric, the polymer was removed from the polycondensation vessel and cut into chip. The total weight of the polymer was 61 kgs.

It is emphasized that the preparation described in Example 1 is conventional except for the addition of 136THX. The polymer was film-forming quality poly(ethylene terephthalate). It contained 3% by weight, based on the polymer of 1-hydroxy-3,6-bis(oxyethoxy)xanth-9-one residues, i.e. residues having formula I with n'=n"=2.

EXAMPLE 2

This Example also describes the preparation of a linear polyester according to the invention using a two-stage process comprising (1) direct esterification followed by (2) polycondensation but the 136THX is added at the start of direct esterification.

To start Stage 1, the following reactants were charged to an autoclave:
60.5 kg: terephthalic acid
1.4 kg: 136THX
30 liters: ethylene glycol
3.5 g: germanium dioxide
3.5 g: sodium hydroxide
(For convenience of handling the GeO$_2$ and the NaOH were both dissolved in the same small portion, about 50 g, of the ethylene glycol.)

The autoclave was pressurised to about 3 atm and heated with stirring. The reaction commenced and water of esterification was removed with some of the excess of glycol. The temperature remained at the reflux temperature. All the water of esterification had been removed in about 2.5 hours when the temperature had risen to 248° C. The pressure was released over a period of about 5 minutes and a small amount (about 5 liters) of glycol removed. This completed the (conventional) direct esterification and 119 g of triphenylphosphate (in methanol) were added. During the direct esterification some of the 136THX is probably esterified to a hydroxyethoxy derivative. There is an excess of hydroxyl groups in the reaction mixture so that the xanthone derivative competes with the ethylene glycol and the equilibrium amount becomes incorporated in he precursor. 77 kg of precursor were obtained and used for polyesterisation. Except for the xanthone derivative this was a conventional precursor. Any 136THX which did not react during the first stage is converted during the second stage.

The precursor was then transferred to the polycondensation vessel and prepared for Stage 2, i.e. polycondensation, by the addition of 21 g of antimony trioxide. Removal of glycol was started by distillation at 230° C. under atmospheric pressure with stirring. When the distillation had started, the pressure was slowly reduced to 0.3 m bar and the temperature was kept at 290° C. The pressure was allowed to return to atmospheric, the polymer was removed from the polycondensation vessel and cut into chip. The total weight of the polymer removed was 61 kgs.

It is emphasized that the preparation described in Example 2 is conventional except for the addition of 136THX. The polymer was film-forming quality poly(ethylene terephthalate). It contained 2% by weight, based on the polymer of 1-hydroxy-3,6-bis(oxyethoxy)xanth-9-one residues, i.e. residues having formula I with n'=n"=2.

EXAMPLES 3 TO 9

These examples relate to products which contain esterification residues of 136THX in accordance with the invention as well as aliphatic acids and polyglycol conventional in elastomeric polyesters.

The polyglycols were poly(ethylene glycol), abbreviated to PEG and poly(1,4-butane-diol), abbreviated to PBG, with molecular weight of 1000 and 2000 as indicated in Table 1.

TABLE 1

| Code | Average Formula | Approximate molecular weight |
|---|---|---|
| PEG 1000 | HO(CH$_2$CH$_2$O)$_{22}$H | 1000 |
| PEG 2000 | HO(CH$_2$CH$_2$O)$_{45}$H | 2000 |
| PBG 1000 | HO(CH$_2$CH$_2$CH$_2$CH$_2$O)$_{14}$H | 1000 |
| PBG 2000 | HO(CH$_2$CH$_2$CH$_2$CH$_2$O)$_{28}$H | 2000 |

The aliphatic acids used were (a) a composition sold by Unilever-Emery under the trade name 'EMPOL 1014' which is an aliphatic dicarboxylic acid with molecular weight about 500 to 700 and (b) azelaic acid.

The polyesters were prepared as described in Example 2, there being charged to the autoclave the reactants specified in Table 2.

TABLE 2

| Example | | 3 | 4 | 5 | 6 | 7 | 8 | 9 |
|---|---|---|---|---|---|---|---|---|
| Terephthalic acid | kg | 60.5 | 60.5 | 60.5 | 60.5 | 60.5 | 60.5 | 60.5 |
| Azelaic acid | kg | 3.5 | — | — | — | — | — | — |
| 'EMPOL 1014' | kg | — | 7 | — | — | — | — | 3.5 |
| Ethylene glycol | liter | 28 | 28 | 28 | 28 | 28 | 28 | 28 |
| 136THX | kg | 1.4 | 1.4 | 2.1 | 1.4 | 2.1 | 1.4 | 1.4 |
| PEG 1000 | kg | — | — | 7 | — | — | — | — |
| PEG 2000 | kg | — | — | — | 3.5 | — | — | — |
| PBG 1000 | kg | — | — | — | — | 3.5 | — | — |

TABLE 2-continued

| Example | | 3 | 4 | 5 | 6 | 7 | 8 | 9 |
|---|---|---|---|---|---|---|---|---|
| PBG 2000 | kg | — | — | — | — | — | 3.5 | 3.5 |
| Germanium dioxide | g | 3.5 | 3.5 | 3.5 | 3.5 | 3.5 | 3.5 | 3.5 |
| Sodium hydroxide | g | 3.5 | 3.5 | 3.5 | 3.5 | 3.5 | 3.5 | 3.5 |

After direct esterification 119 g of triphenylphosphate (in methanol) and 21 g of antimony trioxide were added and the preparation was completed by polymerisation as described in Example 2.

In each of Examples 3 to 9 the product was a polyester of film forming quality. As compared with conventional PET each product had improved UV stability and lower elastic modulus.

I claim:

1. A linear polyester which contains in its molecule esterification residues of a 1-hydroxy-3,6-bis(hydroxyalkoxy)xanth-9-one the amount of said residues being 0.01 to 30% by weight based on the total polymer.

2. A linear polyester according to claim 1 which has an intrinsic viscosity above 0.5 and which contains in its molecule esterification residues of:
   (A) a dicarboxylic acid selected from
      (i) terephthalic acid,
      (ii) isophthalic acid,
      (iii) naphthalene-2,6-dicarboxylic acid,
      (iv) bis(carboxyphenoxy)ethane, and
      (v) an aliphatic carboxylic acid with 4 to 50 carbon atoms in the molecule;
   (B) a glycol with 2 to 10 carbon atoms in the molecule or a polymeric ether formed from one or more of said glycols, and
   (C) a 1-hydroxy-3,6-bis(hydroxy-alkoxy)xanth-9-one, the amount of (C) being between 0.1 and 30% by weight based on A+B+C.

3. A linear polyester according to claim 1 in which in the 1-hydroxy-3,6-bis(hydroxy-alkoxy)xanth-9-one residue the alkoxy groups have 2 to 4 carbon atoms.

4. A linear polyester according to claim 1 which contains as repeating unit

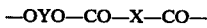
—OYO—CO—X—CO— wherein at least 80 mole % of the X groups represent p-phenylene and the remainder represent m-phenylene and at least 90 mole % of the Y groups represent —$C_nH_{2n}$— where n is an integer from 2 to 10 and 0.01% to 30% by weight based on the total polymer of the Y groups represent the residue of a 1-hydroxy-3,6-bis(hydroxy-alkoxy)xanth-9-one said residues having the formula

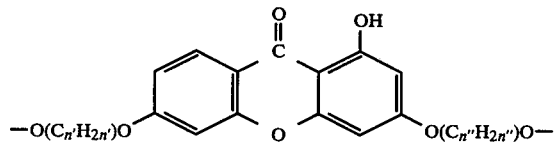

where n' and n" are integers from 1 to 10.

5. A linear polyester according to claim 1 which contains as repeating unit:

—OYO—CO—X—CO— wherein at least 70 mole % of the X groups represent p-phenylene and at least x mole % of the X groups represent the esterification residues of dicarboxylic acids with 4 to 40 carbon atoms in the molecule and at least 70 mole % of the Y groups represent —$C_nH_{2n}$— where n is an integer from 2 to 10, at least y mole % of the Y groups represent

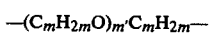
—($C_mH_{2m}O$)$_{m'}C_mH_{2m}$— where m is an integer from 2 to 10 and m' is an integer from 2 to 50 and (x+y) is at least 5 and 0.01 to 30% by weight based on the total polymer of the Y groups represent residues of 1-hydroxy-3,6-bis(hydroxy-alkoxy)xanth-9-one said residues having the formula

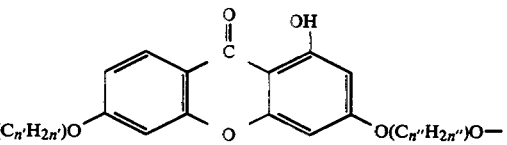

where n' and n" are integers from 1 to 10.

6. A linear polyester according to claim 4 or 5 in which —$C_nH_{2n}$— is —$CH_2CH_2$—.

7. A linear polyester according to claim 4 or 5 in which n'=n"=2.

8. A linear polyester according to claim 5 in which the formula:

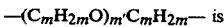
—($C_mH_{2m}O$)$_{m'}C_mH_{2m}$— is

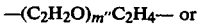
—($C_2H_2O$)$_{m'}C_2H_4$— or

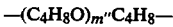
—($C_4H_8O$)$_{m'}C_4H_8$— where m" is 15 to 45.

9. A linear polyester according to claim 2 which contains 0.05 to 5% by weight of residues of the 1-hydroxy-3,6-bis(hydroxy-alkoxy)xanth-9-one.

10. A process for the production of a linear polyester according to claim 2 in which a dicarboxylic acid or a dialkylester thereof and a glycol or a polymeric ether formed from a glycol are reacted together with a 1,3,6-trihydroxy-xanth-9-one whereby one hydroxyl group of the trihydroxyxanthone remains unchanged and the other two react with combined or uncombined glycol to form an ether linkage.

11. A process for the production of a linear polyester according to claim 12 in which a dicarboxylic acid or a dialkylester thereof and a glycol or a polymeric ether formed from a glycol are reacted together with a 1-hydroxy-3,6-bis(hydroxy-alkoxy)xanth-9-one whereby the 1-hydroxy group remains unchanged and the two hydroxy-alkoxy groups take part in the polyester-forming reaction.

12. A process according to claim 10 or 11 in which the dicarboxylic acid comprises terephthalic acid.

13. A process according to claim 10 or 11 in which the glycol comprises ethylene glycol.

14. Shaped articles obtained from a linear polyester according to claim 2.

* * * * *